(12) United States Patent
Wu et al.

(10) Patent No.: US 11,976,156 B2
(45) Date of Patent: May 7, 2024

(54) POLYURETHANE BELT WITH IMPROVED HYDROLYSIS RESISTANCE

(71) Applicant: GATES CORPORATION, Denver, CO (US)

(72) Inventors: William W. L. Wu, Elizabethtown, KY (US); Joseph R. Duke, Jr., Elizabethtown, KY (US); Gregory Butorin, Louisville, KY (US)

(73) Assignee: Gates Corporation, Denver, CO (US)

(*) Notice: Subject to any disclaimer, the term of this patent is extended or adjusted under 35 U.S.C. 154(b) by 0 days.

(21) Appl. No.: 17/948,178

(22) Filed: Sep. 19, 2022

(65) Prior Publication Data

US 2023/0113475 A1 Apr. 13, 2023

Related U.S. Application Data

(60) Provisional application No. 63/248,848, filed on Sep. 27, 2021.

(51) Int. Cl.
| | | |
|---|---|---|
| *C08G 18/48* | (2006.01) | |
| *C08G 18/10* | (2006.01) | |
| *C08G 18/32* | (2006.01) | |
| *F16G 5/20* | (2006.01) | |

(52) U.S. Cl.
CPC ........ *C08G 18/4854* (2013.01); *C08G 18/10* (2013.01); *C08G 18/3243* (2013.01); *F16G 5/20* (2013.01)

(58) Field of Classification Search
CPC ....... F16G 5/20; C08G 18/4854; C08G 18/10; C08G 18/3243
See application file for complete search history.

(56) References Cited

U.S. PATENT DOCUMENTS

| | | |
|---|---|---|
| 6,964,626 B1 | 11/2005 | Wu et al. |
| 2009/0227406 A1 | 9/2009 | Wu et al. |
| 2011/0129647 A1 | 6/2011 | Duke, Jr. et al. |
| 2017/0029578 A1 | 2/2017 | Wu et al. |

OTHER PUBLICATIONS

Adiprene LFH 120 Product Data Sheet. p. 1-2. 2019.*
Mail Stop PCT:ISA/US; Commissioner for Patents; Notification of Transmittal of the International Search Report and the Written Opinion of the International Searching Authority, or the Declaration; International PCT application No. PCT/US2022/044038; dated Dec. 23, 2022.

* cited by examiner

*Primary Examiner* — Michael L Leonard
(74) *Attorney, Agent, or Firm* — Kevin J. Aiken, Esq.

(57) ABSTRACT

A belt for power transmission or transport comprising a polyurethane belt body, wherein the polyurethane of the belt body is the reaction product of a urethane prepolymer and a diamine chain extender, and the urethane prepolymer is based on a polyether and a linear aliphatic diisocyanate. The belt has excellent hydrolysis resistance.

3 Claims, 6 Drawing Sheets

FIG. 4 PTMEG/TDI Comparative Examples

POLYURETHANE BELT WITH IMPROVED HYDROLYSIS RESISTANCE

BACKGROUND OF THE INVENTION

This invention relates generally to cast polyurethane (PU) compositions for power transmission and transport belts and the belts made therefrom, more particularly to hexamethylene 1,6-diisocyanate ("HDI")-based polyurethane compositions and belts having outstanding resistance to hot water exposure.

While there are existing PU belts that are known for high-torque or tough dynamic applications (e.g. Poly Chain® GT® belts), they are not generally recommended for use in applications exposed to hot water due to the possibility of degradation of the polyurethane in the belt body part.

Prior approaches to make polyurethane belts for hot water applications include using polycarbonate polyols ("PCB") and para-phenylene diisocyanate ("PPDI"), to make PPDI prepolymers and then curing with diamine curatives. These approaches have disadvantages such as high cost, high viscosity for processing, and still unsatisfactory hydrolysis resistance for some applications.

U.S. Pat. No. 5,231,159 to Patterson et al. discloses polyurethane formulations for belts for a very fast reaction-injection molding (RIM) process. Although aliphatic polyisocyanates such as trans-1,4-cyclohexyl diisocyanate ("t-CHDI") and HDI are mentioned briefly in long lists of potential ingredients, the preferred polyisocyanate is clearly aromatic. U.S. Pat. No. 3,656,360 to Fix makes similar disclosures. U.S. Pat. No. 5,112,282, May 12, 1992, to Patterson also discloses toothed belts made by a RIM process.

U.S. Pat. No. 5,807,194 to Knutson et al., the contents of which are hereby incorporated herein by reference, discloses a cast polyurethane toothed belt with carbon fiber tensile cord and wear-resistant nylon fabric on the teeth.

U.S. Pat. No. 6,964,626 B1 to Wu et al., the contents of which are hereby incorporated herein by reference, discloses molded polyurethane/urea elastomers useful in belts and prepared by reacting polyisocyanate prepolymers with compact, symmetric and aromatic diamine chain extenders, mixtures of symmetric primary diamine chain extenders and secondary diamine chain extenders, or mixtures of symmetric primary diamine chain extenders. The polyisocyanate prepolymers are based on polycarbonate polyols or polyester polyols reacted with organic polyisocyanates which are either, such as PPDI, 1,5-naphthalene diisocyanate ("NDI"), and 2,6-toluene diisocyanate ("TDI"), or are aliphatic and possess trans or trans,trans geometric structure, such as t-CHDI and trans,trans-4,4'-dicyclohexylmethyl diisocyanate ("t,t-HMDI"). U.S. Pat. No. 7,824,288 B2 to Wu et al., the contents of which are hereby incorporated herein by reference, discloses plasticizers useful in such cast polyurethane compositions for belts. There is no mention in this publication of linear aliphatic diisocyanates.

Syed et al., "Stability in the Water: Aliphatic Diisocyanates in PUs," Urethanes Technology, Jul. 1988, pp. 25-27, states that "PUs based on aliphatic diisocyanates have the best hydrolytic stability." The only aliphatic diisocyanate mentioned in the article is t-CHDI.

U.S. Pat. Pub. No. 2005/0124777A1, the contents of which are hereby incorporated herein by reference, discloses low-free-isocyanate prepolymers based on HDI that are suitable for making polyurethane golf-ball covers and wheels.

Thus, there is a need for PU belts that are suitable for use in harsh hot water environments that also have improved manufacturing efficiencies and lower production costs.

SUMMARY OF THE INVENTION

The present invention is directed to compositions, systems and methods which provide hydrolysis-resistant polyurethane belts or provide cast polyurethane belts suitable for use in hot water environments. By using ether-based, HDI prepolymers cured with diamine curatives such as 4,4'-methylene-bis-(3-chloro-2,6-diethylaniline) ("MCDEA"), the resulting belts survive a harsh hot water environment while improving manufacturing of such belts.

The invention is directed to a belt for power transmission or transport having a polyurethane belt body, wherein the polyurethane of the belt body is the reaction product of a urethane prepolymer and a diamine chain extender, and the urethane prepolymer is based on a polyether and a linear aliphatic diisocyanate.

In preferred embodiments the polyether may be polytetramethylene ether glycol ("PTMEG"). The linear aliphatic diisocyanate may be HDI. The diamine chain extender may be MCDEA or 4,4'-methylene-bis-(2,6-diethylaniline) ("MDEA").

In another aspect of the invention, the molar ratio of amino groups in the diamine chain extender to the isocyanate groups in the prepolymer may be in the range of from about 80% to 120%, or from 90% to 115%, or from 100% to 110%, or about 105%, or from 100% to 105%.

In another aspect, the prepolymer may have a low viscosity, preferably less than 500 cP at 70° C., or less than 400 cP at 70° C., or less than 300 cP at 70° C., or less than 200 cP at 70° C.

The belt may be in the form of a toothed power transmission belt, which may also include a tooth cover comprising a fabric and/or plastic laminate and a tensile member, such as a cord, embedded in the belt body.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
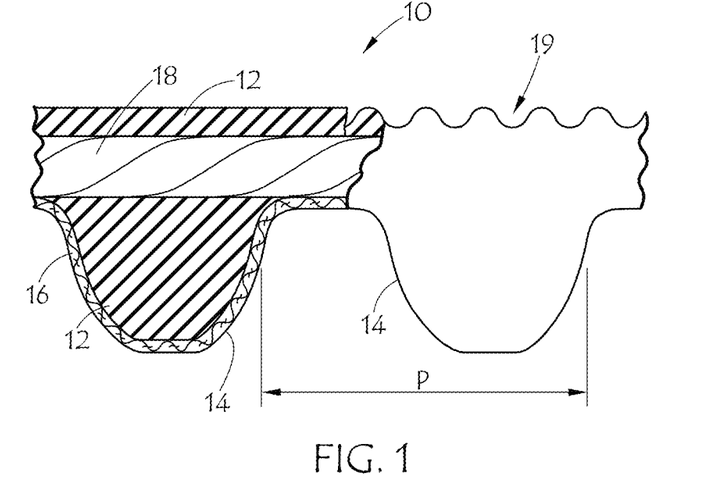
FIG. 1 is a partially fragmented side view of a toothed belt according to an embodiment of the invention.

Referring to FIG. 1, the toothed belt 10 of the invention has a body 12 which is polyurethane belt material according to an embodiment of the invention, with belt teeth 14 formed of the body and spaced apart at a pitch P. The teeth are covered with a wear-resistant fabric 16 disposed along peripheral surfaces of the belt teeth. A tensile member 18 is embedded in the belt body. The tensile member 18 may be a helically spiraled cord, a plied and twisted cord, a composite cord, a braided cords or any other suitable cord. A plurality of transversely oriented grooves 19 may optionally be formed in an outer layer of the belt. While not necessary, the grooves 19 may reduce belt weight and somewhat enhance belt flexibility.

Figure 2:
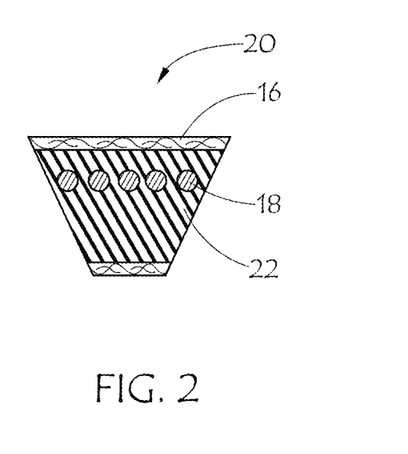
FIG. 2 is a cross-section view of a V-belt.

Referring to FIG. 2, the V-belt 20 of the invention has a body 22 which is polyurethane belt material according to an embodiment of the invention, with angled sides forming a trapezoidal-shaped body. One or more surfaces of the V-belt may be covered with a wear-resistant fabric 16 as in the toothed belt. A tensile member 18 is embedded in the belt body. The tensile member 18 may be a helically spiraled cord, a plied and twisted cord, a composite cord, a braided cord or any other suitable cord. A plurality of transversely oriented grooves or notches (not shown) may optionally be formed in an outer layer (top and/or bottom) of the belt. The grooves or notches may reduce belt weight and somewhat enhance belt flexibility.

Figure 3:
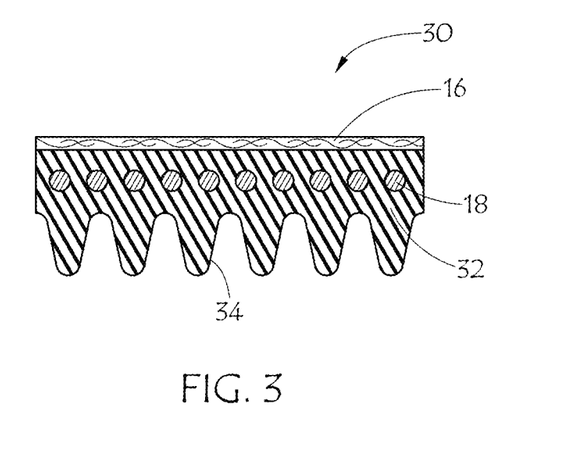
FIG. 3 is a cross-section view of a multi-v-ribbed belt.

Referring to FIG. 3, the multi-v-ribbed belt 30 of the invention has a body 32 which is polyurethane belt material according to an embodiment of the invention, with ribs 34 formed lengthwise in the body. The ribs and/or the back of the belt may be covered with a wear-resistant fabric 16 as in the toothed belt. A tensile member 18 of is embedded in the belt body. The tensile member 18 may be a helically spiraled cord, a plied and twisted cord, a composite cord, a braided cords or any other suitable cord.

The wear-resistant fabric 16 and the tensile member 18 may be of any suitable material or design known in the art. The fabric may be woven, knit or nonwoven, single-layered or multi-layered. The fabric may be laminated or treated in known ways. A treated fabric may be referred to as a jacket. Preferred jacket materials include nylons (polyamides), aramids, polyesters, and polyolefins, including fibers and films. Polyester fabric may provide better hydrolysis resistance than nylon fabric. The tensile member may be treated or untreated. Preferred cords include aramid fiber, fiberglass, steel wire or cable, and carbon fiber aramid, polyester, and composites thereof. It may be noted that other belt shapes may also be used, such as flat belts, round belts, or double sided toothed, V-, or V-ribbed belts.

The inventive PU (polyurethane) belt formulations are based on a polyether-HDI prepolymer cured with a diamine chain extender or curative. HDI refers to hexamethylene diisocyanate, a linear, aliphatic diisocyanate. HDI is a pale-yellow liquid with a strong odor. It is also commonly known as 1,6-hexamethylene diisocyanate and 1,6-diisocyanato-hexane. Commercial examples of HDI include materials sold under the Desmodur® trademark by Covestro, and HDI materials sold by Rhodia. HDI is typically used to make polyurethane foams and coatings. It is also used as a hardener in automobile and airplane paints and to make nylon.

Polyester and polycarbonate polyols for the prepolymer are known in the art, but preferably, polyether polyols are used in the present invention. The polyether on which the prepolymer may be based can be based on monomers such as ethylene oxide, propylene oxide, and butylene oxides, whether by polymerizing or copolymerizing the low molecular weight glycols, by the reaction of one or more such alkylene oxides with the glycols or with triol, or by ring-opening polymerizations of monomers such as tetrahydrofuran. Generally, the polytetramethylene ether glycols ("PTMEG") are the preferred polyether glycols.

The polyether-HDI prepolymer may thus be the reaction product of PTMEG and HDI. A preferred range for the isocyanate content ("NCO" percent by weight) in the prepolymer is from 4% to 8%, particularly for use in the body of a power transmission belt or transport belt. NCO content can be determined by the method described in ASTM D2572.

Suitable commercial prepolymers include for example, the Adiprene LFH series, sold under that trademark by Lanxess. Low-free-isocyanate grades of prepolymer are preferred. U.S. Pat. Pub. No. 2005/0124777A1 describes methods of making suitable prepolymers.

The use of diamine chain extenders, while typically more difficult to process than diol chain extenders due to their higher melting points, contributes greater thermal stability via urea linkages which are more stable than their urethane counterparts. The preferred diamine chain extenders useful in the present invention possess the following three characteristics: symmetric structure for improved phase separation of the resulting elastomers; non-bulky substitute groups on the aromatic rings if such groups are present in order that hard segment crystallization and overall phase separation of the resulting elastomers is not retarded; and proper reactivity with isocyanate group thus eliminating the need for catalysts in the formulations. Primary diamine chain extenders are used for proper reactivity.

The symmetric primary diamine chain extenders useful in the present invention are those capable of reacting with polyisocyanate prepolymers rapidly without the need for catalysts. In addition, these chain extenders should contribute to the excellent dynamic performance of the resulting elastomers of the present invention. The symmetry of the chain extenders useful in the present invention provides improved phase separation and hence increases the thermal stability of the final polyurethane/urea elastomers in dynamic applications, thus making the resulting belts suitable for use in harsh hot water environments. Suitable primary diamine chain extenders include but are not limited to symmetric aromatic amines with molecular weights of from about 90 to about 500, and mixtures thereof. Examples include: 1,4-phenylenediamine, 2,6-diaminotoluene, 1,5-naphthalenediamine, 4,4'-diaminodiphenyl methane, 3,3'- dimethyl-4,4'diaminodiphenyl methane, 1-methyl-3,5-bis (methylthio)-2,6-diaminobenzene, 1-methyl-3,5-diethyl-2, 6-diaminobenzene, MCDEA, 4,4'-methylene-bis-(ortho-chloroaniline), 4,4'-methylene-bis-(2,3-dichloroaniline), MDEA, 4,4'-methylene-bis-(2,6-diisopropylaniline), 4,4'methylene-bis-(2-methyl-6-isopropylaniline), 4,4'-di-amino diphenyl sulfone, trimethylene glycol di-para-amino-benzoate ("TGDAB"), and the like. The diamine chain extender or curative may preferably be MCDEA or MDEA.

The polyisocyanate prepolymers of the present invention may be reacted via standard molding or casting processes with a chain extender as known in the polyurethane/urea art. The polyurethane elastomers of the present invention utilize a molar ratio of the amine groups from the diamine chain extender to the isocyanate groups in the prepolymer (i.e., "Cure Theory" percentage) of from about 80% to about 120%, or from about 85% to 115%, or preferably from about 100% to about 110%, or more preferably from about 100% to about 105%, or at about 105%. If diol and/or diamine is used, then the molar ratio of the amine+hydroxyl equivalent to the isocyanate is used.

In some of the prior art, the inverse ratio is taught to be preferably from about 1.05:1 to about 1.1:1 (i.e., an "isocyanate index"), which represents a Cure Theory percentage of from 91% to 95%. A most-preferred cure theory of about 90% to about 105% has been recommended in U.S. Pat. Pub. No. 2005/0124777A1, with 98% used in all the examples therein. From past experience, lower values of Cure Theory, in the range of 90-95%, have been preferred as more reliable or robust for processing the polyurethane. Here, it was discovered that range of 105 to 110% gives unexpected advantages in performance of belts, as will be seen in the examples below. The polyurethane elastomers of the present invention may be mixed with additives such as pigments, colorants, antistatic agents, plasticizers, etc., at a suitable stage of belt fabrication.

The choice of diamines, Cure Theory, and NCO content can affect multiple variables including the pot life, speed of reaction, and physical properties such as modulus, toughness, and tensile strength of the resulting polyurethane composition. Speed of reaction can be adjusted by choice of diamine and by choice of catalyst. Modulus is generally related to the degree of phase separation or hard segment content. It was found that both MCDEA and MDEA produced excellent degrees of phase separation with polyether-based HDI prepolymers. Surprisingly, when higher NCO (i.e., 6%-8% NCO) prepolymer was used, the resulting polyurethane/urea elastomers exhibited not only higher modulus but also higher elongation and therefore higher toughness than when lower NCO (i.e., 4%-6% NCO) was used.

In some embodiments, the preferred formulation yields a very, low-viscosity urethane system. Low viscosity may be advantageous for facilitating penetration of the fabric or cord by the polyurethane during the molding or casting process. Low viscosity is particularly advantageous for open casting operations or other molding operations carried out at low pressure. These formulations are also very useful in high pressure molding or casting, but it is not necessary to use high pressure with this material. As a result, simpler, more cost effective, processing equipment may be used for casting these materials, because high pressure equipment is not required. It is found that PTMEG has lower viscosity than PCB or polycaprolactone ("PCL") alternatives. Also, HDI has a low viscosity. It is thought that the combination of PTMEG and HDI may be synergistic, resulting in a prepolymer with lowest possible viscosity (described as "almost like water") (see TABLE 6 below). This makes for excellent penetration of fabrics and textiles, as well as quicker and easier bubble elimination during casting.

The inventive PU formulations provide improved resistance to hydrolysis. Hydrolysis herein refers to negative effects on a composition or composite due to exposure to water, in particular to hot water or steam. Although hydrolysis may have various chemical definitions or implications depending on the particular materials or chemical art involved, herein the term is used more generally, not wishing to be limited to any particular chemical reaction or mechanism. The negative effects of hot water exposure may include and be indicated by one or more of the following symptoms: swelling and dimensional instability from water absorption, loss of adhesion between belt components, loss of physical properties such as hardness, modulus, strength properties, and poor durability in a belt application.

Prior approaches to make polyurethane belts for hot water applications: using PCB or PCL polyols reacted with PPDI, TDI, or MDI to make prepolymers and then cured with diamine curatives such as listed above. Their disadvantages included high cost, high viscosity for processing, and less-than-ideal hydrolysis resistance. Conventional PTMEG prepolymers based on aromatic diisocyanates such as MDI and TDI are also subject to hydrolysis.

To summarize, the advantages of this invention include low material cost, low viscosity for ease of processing, and good dynamic belt performance in hot water applications whether immersed or splashed. Thus, the present invention offers a good balance of properties including cost, viscosity, pot life, modulus, hydrolysis resistance, and belt performance.

Any suitable method of manufacturing the belt may be used, although casting is preferred. Cast polyurethane timing belts may be made for example as described in U.S. Pat. Nos. 5,807,194 and 6,964,626, the contents of which are incorporated herein by reference.

EXAMPLES

A series of polyurethane formulations were made as indicated in TABLE 1. The target Cure Theory percentage (amine to NCO molar ratio) for all the formulations was 90%. Comparative examples are indicated with "Comp. Ex." and inventive examples with "Ex." The formulations were cast in sheets suitable for making tensile test specimens according to ASTM D-412 using Die D specimens. Specimens were tested as molded, after two days immersion in 100° C. water, and after four days immersion in 100° C. water. The stress at 5, 15, 20, 25, 50, 100, 200, 300, 400% elongation and at break was recorded during the tensile test. The stress-strain curves are plotted in FIGS. 4-7. Hydrolysis is considered to be indicated by a reduction in modulus after hot water immersion, or by a reduction in tensile stress at break, or by a significant change in elongation at break.

Figure 4:
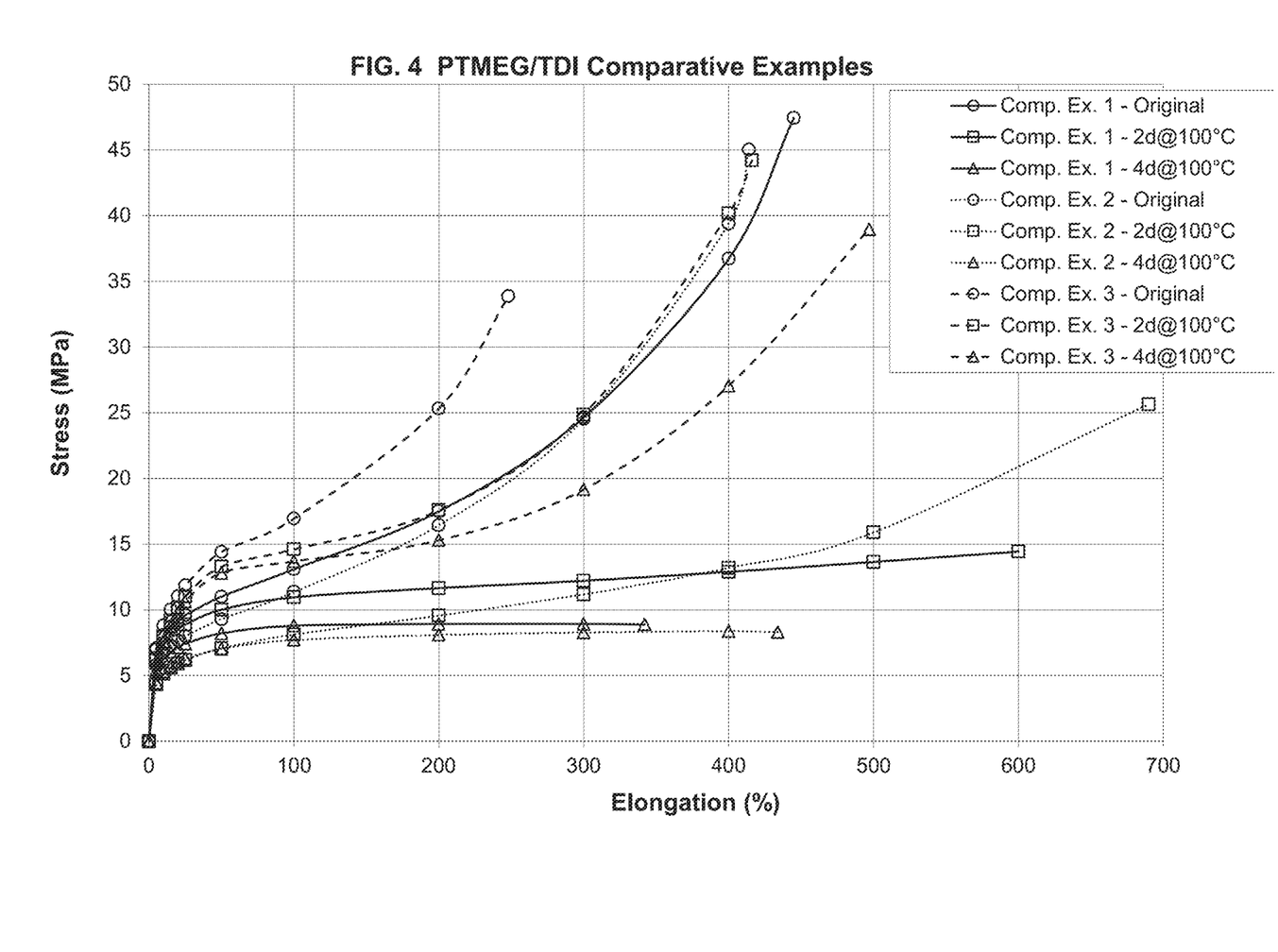
FIG. 4 shows stress-strain curves for comparative examples of polyurethane formulations.
Figure 5:
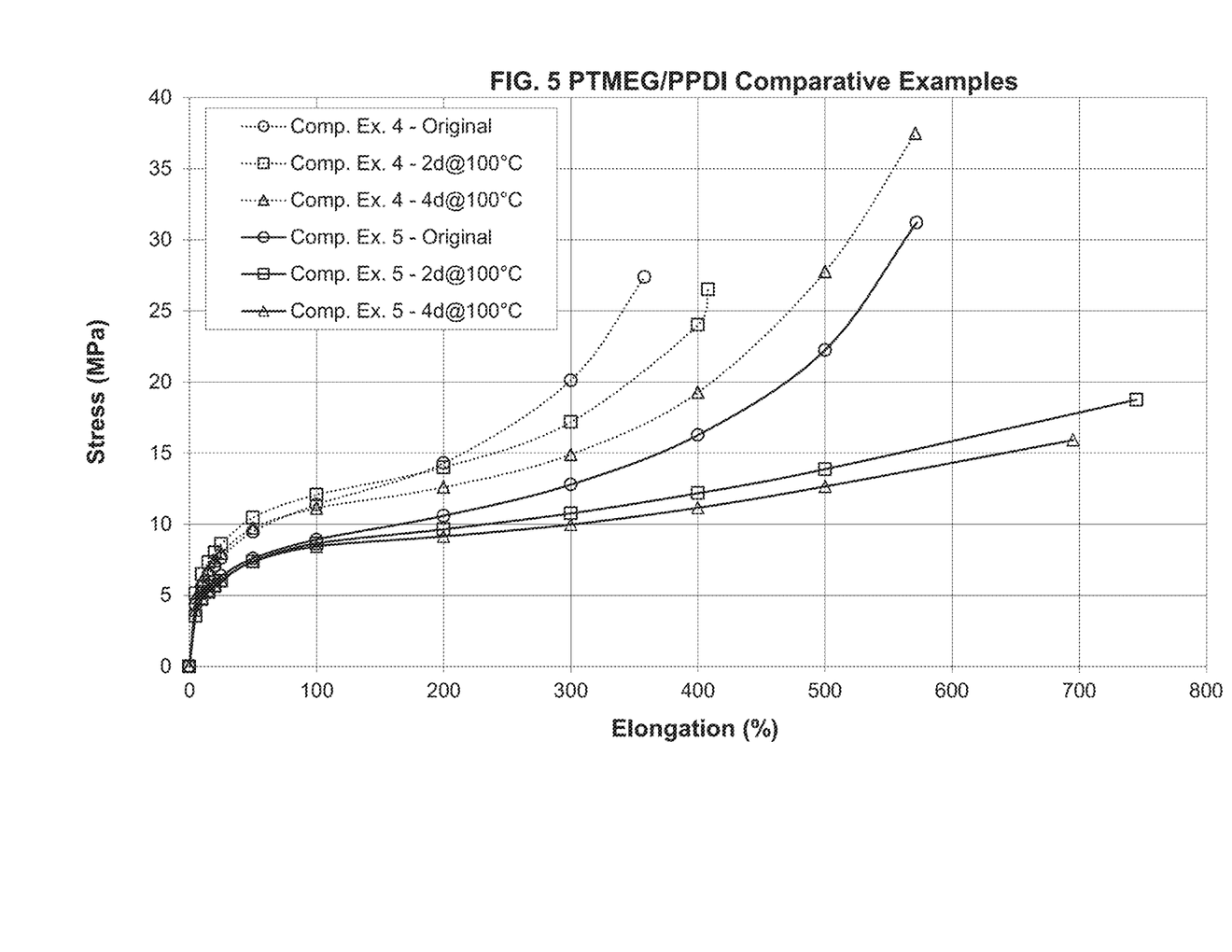
FIG. 5 shows stress-strain curves for comparative examples of polyurethane formulations.
Figure 6:
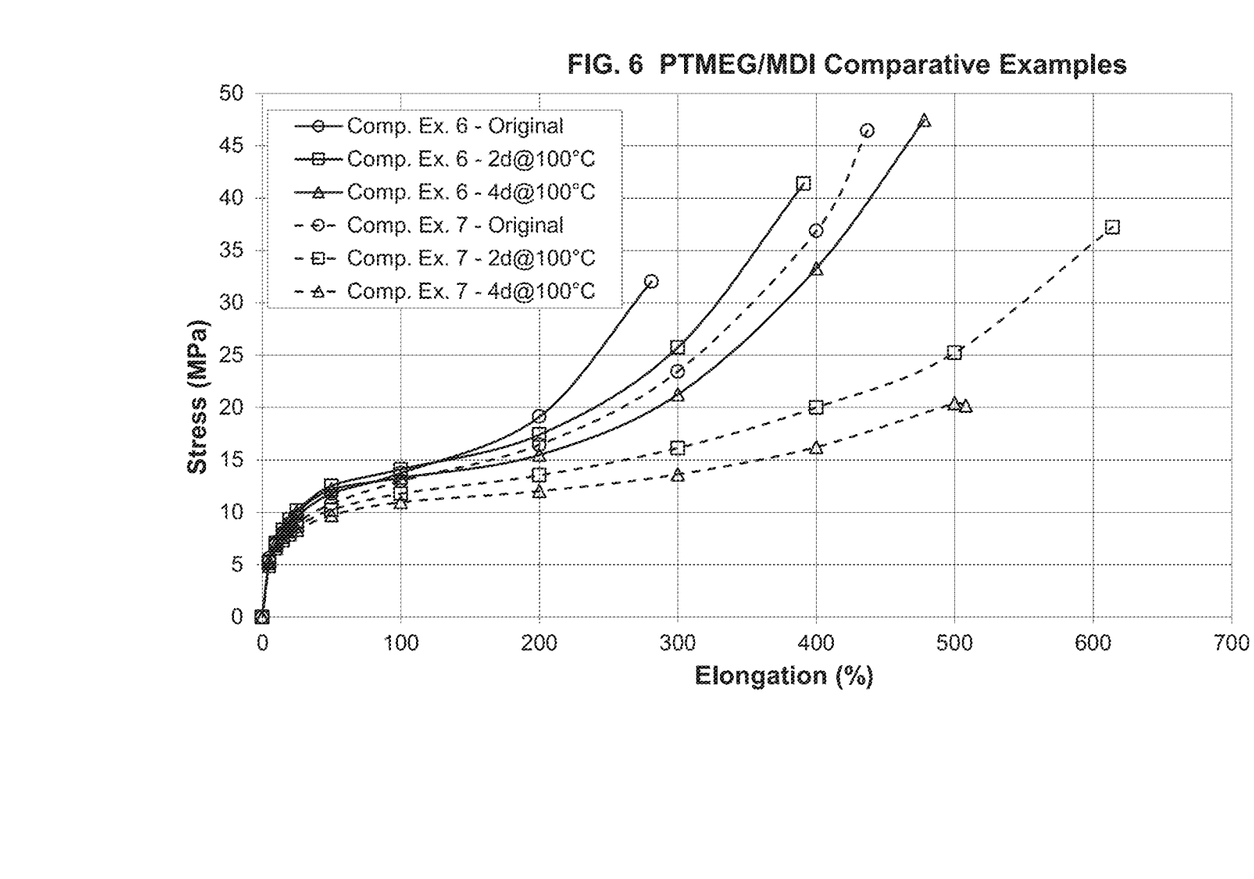
FIG. 6 shows stress-strain curves for comparative examples of polyurethane formulations.

FIG. 4 shows stress-strain curves for Comp. Ex. 1-3, which are typical of commercially useful formulations based on PTMEG and TDI. Comp. Ex. 1 and 2 show dramatic decrease in modulus and tensile stress at break due to hot water exposure. Comp. Ex. 3 shows a decrease in modulus and increase in elongation at break, even though strength does not decrease. FIG. 5 and FIG. 6 show stress-strain curves for PTMEG/PPDI and PTMEG/MDI comparative examples, respectively. Such recipes are recommended in the art for improved hydrolysis resistance. Although, the water resistance seems improved over PTMEG/TDI, there is still significant loss of modulus, increase in elongation at break, and in some cases loss of tensile strength.

Figure 7:
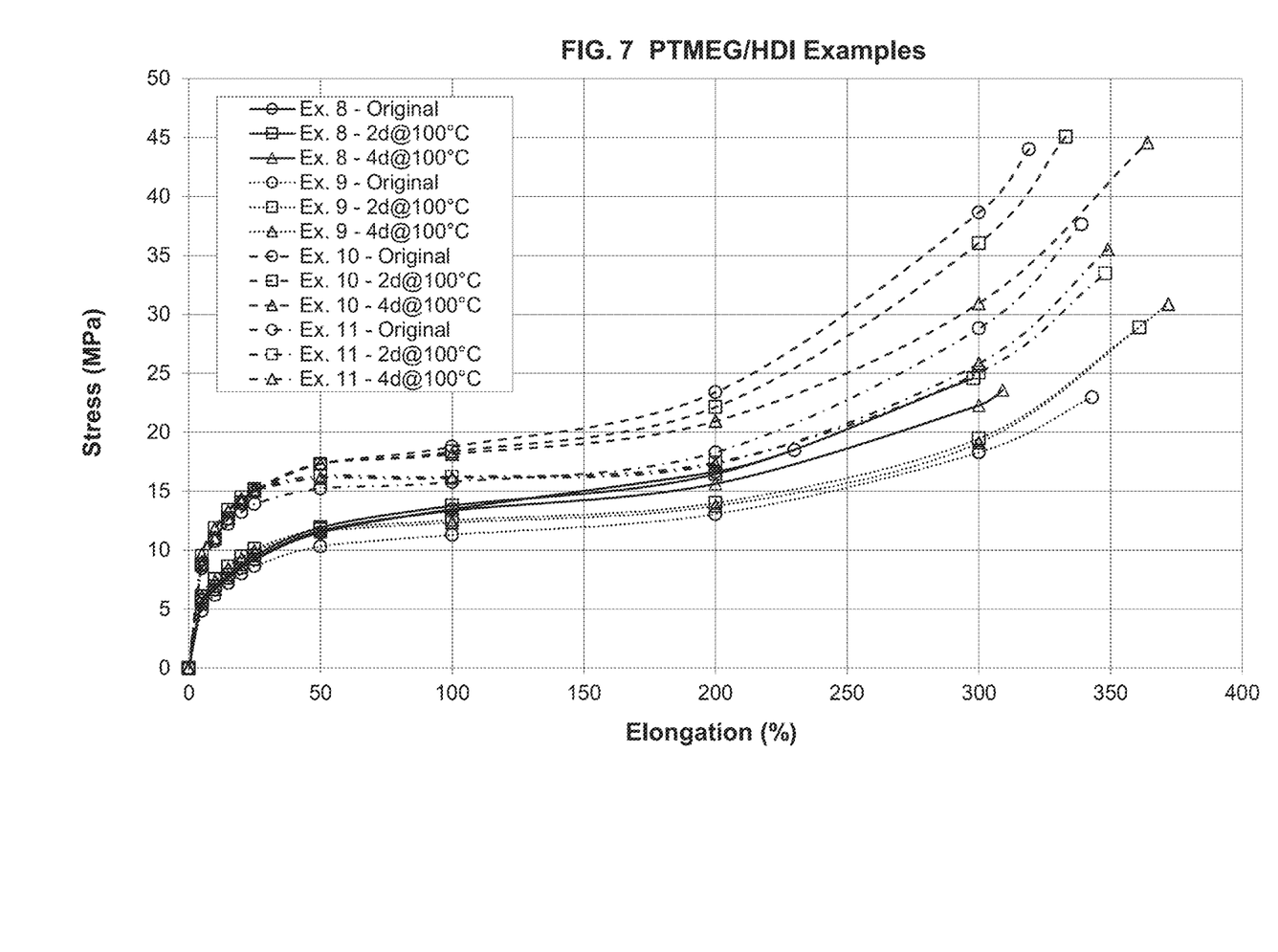
FIG. 7 shows stress-strain curves for inventive examples of polyurethane formulations.

FIG. 7 shows stress-strain curves for inventive Ex. 8-11. Switching to HDI in the PTMEG/HDI prepolymers clearly provides the desired hydrolysis resistance. The stress curves for Ex. 8 and Ex. 9 are essentially the same for original and aged samples. The stress curves for Ex. 10 and Ex. 11 shows a little more scatter, but the changes with aging are not significant. The two higher NCO examples, Ex. 10 and Ex. 11, show higher modulus than the lower NCO examples, Ex. 8 and Ex. 9.

TABLE 1

| Example No. | Prepolymer Composition | NCO (%) | Plasticizer (pph) | Curative |
|---|---|---|---|---|
| Comp. Ex. 1 | PTMEG/TDI | 5.50 | 2 | TGDAB |
| Comp. Ex. 2 | PTMEG/TDI | 5.50 | None | TGDAB |
| Comp. Ex. 3 | PTMEG/TDI | 5.50 | None | MCDEA |
| Comp. Ex. 4 | PTMEG/PPDI | 4.10 | 5 | MCDEA |
| Comp. Ex. 5 | PTMEG/PPDI | 4.10 | 5 | TGDAB |
| Comp. Ex. 6 | PTMEG/MDI | 5.00 | 10 | MCDEA |
| Comp. Ex. 7 | PTMEG/MDI | 5.00 | 10 | TGDAB |
| Ex. 8 | PTMEG/HDI | 5.20 | None | MCDEA |
| Ex. 9 | PTMEG/HDI | 5.20 | None | MDEA |
| Ex. 10 | PTMEG/HDI | 7.10 | None | MCDEA |
| Ex. 11 | PTMEG/HDI | 7.10 | None | MDEA |

Three belt constructions were made using the same nylon fabric tooth cover, carbon fiber tensile cord, and different cast polyurethane belt body formulations. The control belt was made with Comp. Ex. 1. Two inventive belts were made with Ex. 9 and Ex. 10, respectively, again with 90% Cure Theory. The belts were 14-mm pitch with the Gates GT® tooth profile. Samples of each construction were tested as made and after 1 week (actually 6 or 7 days as indicated) and 2 weeks (14 days) in a 93° C. water bath. The tests included dimensional measurements, static adhesion tests, and dynamic belt tests. The dimensional measurements included weight gain, belt thickness, and belt width. The dimensional changes were minimal for all the sample belts. The weight gain for the inventive and comparative belts was comparable and around 1.5-1.7%.

The static adhesion tests include a test that shears a tooth from the belt. The test measures the fabric shear force and the polyurethane shear force in kN/20 mm of belt width. A cord adhesion test involved pulling two central cords from a section of belt. The results are shown in TABLE 2. The fabric shear results are somewhat similar for all three belts as would be expected because the same fabric was used in all three. There is some indication that the water immersion decreases the fabric shear strength as might be expected for nylon. The PU shear strength shows a clear difference between the Comparative belt and the inventive belts. The Comp. Ex. 1 belt loses most of its PU shear strength after 14 days of immersion. On the other hand, the inventive belt of Ex. 9 actually gained PU shear strength during the water immersion. It appears the hot water may be improving the belt properties by providing additional post cure time. Ex. 10 retained its PU shear strength after immersion.

The cord adhesion results also reflect the effects of hydrolysis for Comp. Ex. 1. Comp. Ex. 1 loses half its cord adhesion after 14 days in hot water. Since the cord is bonded to the polyurethane, this loss of adhesion is attributed to the loss of shear strength of the polyurethane. The inventive belts lose very little to none of their cord adhesion.

Finally, the dynamic belt test was a load life test on a two-point drive with a belt load of 73 HP. The belt width is 20 mm, with 85 teeth (14MGT). The two-point drive includes a 32-groove driver pulley and 32-groove driven pulley. The driver turns at 1750 RPM and the installation tension is from 2.81 to 3.07 kN. The belts were run to first sign of failure and the life reported in TABLE 2. The Comp. Ex. 1 belt could not withstand the test after immersion in hot water, whether for one week or two weeks. The inventive Ex. 9 and 10 did just fine after the water immersion. Ex. 10 even appears to have improved belt life after 14 days in hot water.

TABLE 2

| Test | Comp. Ex. 1 | Ex. 9 | Ex. 10 |
|---|---|---|---|
| Fabric shear (kN/20 mm) - original | 2.83 | 3.17 | 3.70 |
| After 7 days in hot water | 1.79 | 2.63 | 3.321 |
| After 14 days in hot water | 1.50 | 2.47 | 3.35 |
| Polyurethane shear (kN/20 mm) - original | 3.77 | 0.98 | 2.87 |
| After 7 days in hot water | 2.32 | 1.31 | 2.651 |
| After 14 days in hot water | 1.10 | 1.77 | 2.94 |
| Cord Adhesion (kN/2 cords pulled out) - original | 4.37 | 3.52 | 5.15 |
| After 7 days in hot water | 2.73 | 3.22 | 4.771 |
| After 14 days in hot water | 2.16 | 3.14 | 4.79 |
| Load Life Belt Test (life in hours) - original | 60.0 | 44.5 | 63.7 |
| After 7 days in hot water | 0.4 | 38.4 | 69.61 |
| After 14 days in hot water | 0.2 | 43.3 | 113.0 |

[1]after 6 days.

A second series of belts were made based on Ex. 10, but varying the Cure Theory of the polyurethane from 85% to 115%. Surprisingly, it was found that 90% Cure Theory (i.e., Ex. 10) was not the optimum for this formulation when it comes to belt performance. The same static adhesion test and Load Life Belt Test as above were repeated on the original (un-water-aged) belts, and the results are reported in TABLE 3. Fabric shear was about the same for all the belts, which is expected because the same fabric is used for all. However, polyurethane shear and belt load life both show a significant dependence on Cure Theory. Cure theory below 100% is certainly adequate, but performance is significantly enhanced when cure theory is at or above 100%, peaking at about 105% and falling off above 110%. Thus, a useful range of Cure Theory for the inventive belts and compositions is 85% to 110%, and a preferred range is from 100% to 110%, or 100% to 105%, with an optimum of about 105%.

TABLE 3

| Test | Ex. 12 | Ex. 10 | Ex. 13 | Ex. 14 | Ex. 15 |
|---|---|---|---|---|---|
| Cure Theory (%) | 85 | 90 | 95 | 105 | 115 |
| Fabric shear (kN/20 mm) - original | 3.57 | 3.70 | 3.70 | 3.47 | 3.48 |
| Polyurethane shear (kN/20 mm) | 2.33 | 2.87 | 2.88 | 4.04 | 3.08 |
| Load Life Belt Test (life ratio[1]) | 0.85 | 1.06 | 1.49 | 2.15 | 0.06 |

[1]Relative to an original belt sample using Comp. Ex. 1.

Figure 8:
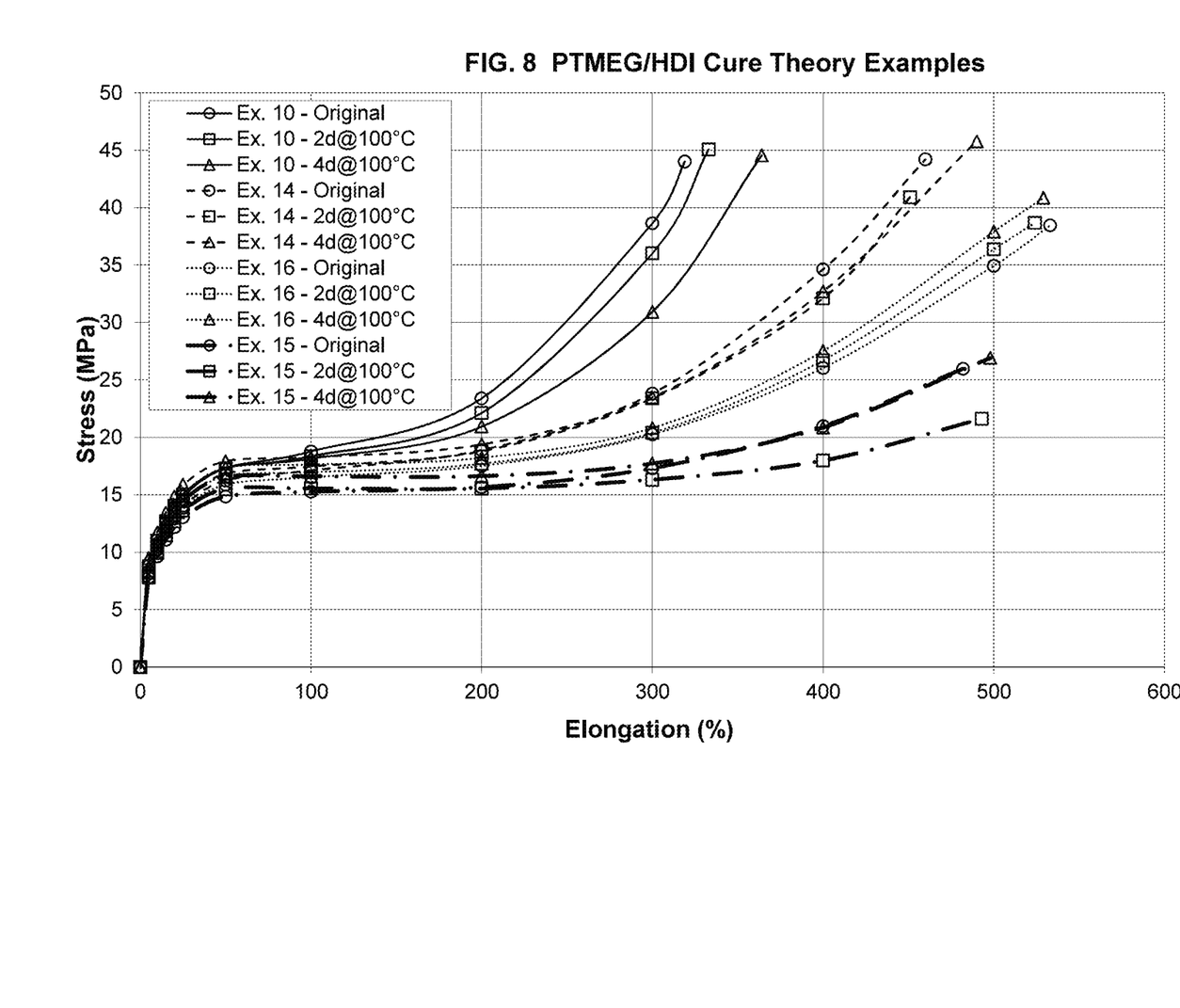
FIG. 8 shows stress-strain curves for inventive examples of polyurethane formulations.

In another Cure Theory study, the higher cure theory formulations were tested for hydrolysis resistance. FIG. 8 summarizes the results in the form of tensile properties (stress-strain curves) of original cast specimens and aged specimens. In FIG. 8, Ex. 16 has 110% Cure Theory so is listed in the key between Ex. 14 and Ex. 15. Surprisingly, cure theory adjustments did not affect hydrolysis resistance, although stress-strain behavior was noticeably affected due to molecular weight reduction. From FIG. 8, it can be seen that Ex. 14 and Ex. 16 have the best combination of tensile strength and elongation. It is suspected that this contributes to the higher polyurethane shear values and Load Life in TABLE 3.

TABLE 4 and TABLE 5 compare the 90% Cure Theory examples (Ex. 8-11) with some higher Cure Theory examples (Ex. 14 and 16-18), focusing on modulus and ultimate strength properties. The TABLE 4 examples use MCDEA as curative and the TABLE 5 examples use MDEA. It can be seen the higher Cure Theory examples have comparable high modulus values, but better combinations of tensile strength and elongation (i.e., toughness). This seems to correlate as well with the surprising optimum in belt performance at higher Cure Theory levels mentioned above. (See TABLE 3 and Ex's 14 and 16-18 in TABLEs 4 and 5).

TABLE 4

| Test | Ex. 8 | Ex. 10 | Ex. 14 | Ex. 16 |
|---|---|---|---|---|
| Cure Theory (%) | 90 | 90 | 105 | 110 |
| Curative (Chain Extender) | MCDEA | MCDEA | MCDEA | MCDEA |
| NCO (Wt. %) | 5.2 | 7.1 | 7.1 | 7.1 |
| Stress at 10% elongation (MPa) | 6.7 | 11.0 | 10.3 | 10.2 |
| Stress at 25% elongation (MPa) | 9.2 | 14.9 | 13.1 | 13.8 |
| Stress at break (MPa) | 18.5 | 44.0 | 44.2 | 38.5 |
| Elongation at Break (%) | 230 | 319 | 460 | 533 |

TABLE 5

| Test | Ex. 9 | Ex. 11 | Ex. 17 | Ex. 18 |
|---|---|---|---|---|
| Cure Theory (%) | 90 | 90 | 100 | 105 |
| Curative (Chain Extender) | MDEA | MDEA | MDEA | MDEA |
| NCO (Wt. %) | 5.2 | 7.1 | 7.1 | 7.1 |
| Stress at 10% elongation (MPa) | 6.2 | 10.7 | 10.6 | 10.6 |
| Stress at 25% elongation (MPa) | 8.6 | 13.9 | 13.9 | 13.5 |
| Stress at break (MPa) | 23.0 | 37.6 | 37.5 | 37.3 |
| Elongation at Break (%) | 343 | 339 | 428 | 479 |

A viscosity study shows the dramatic reduction in prepolymer viscosity possible with PTMEG/HDI prepolymer over other prepolymers. TABLE 6 summarizes viscosity data for various types of prepolymers, measured at the indicated measurement temperature. Higher NCO indicates lower molecular weight, which correlates with lower viscosity. PTMEG/HDI prepolymer is uniquely positioned as having the lowest viscosity of all the materials tested. This makes it uniquely suited for use in textile-reinforced polyurethane composites such as the belts described herein.

TABLE 6

| Prepolymer composition | NCO (Wt. %) | Measurement temperature (° C.) | Viscosity (cP) |
|---|---|---|---|
| PCB/PPDI | 3.75 | 80 | 6000 |
| PCB/TDI | 4.0 | 85 | 5200 |
| PCB/HDI | 6.0 | 70 | 1810 |
| PTMEG/PPDI | 4.1 | 70 | 1700 |
| PTMEG/TDI | 5.5 | 70 | 500 |

TABLE 6-continued

| Prepolymer composition | NCO (Wt. %) | Measurement temperature (° C.) | Viscosity (cP) |
|---|---|---|---|
| PTMEG/HDI | 5.2 | 70 | 310 |
| PTMEG/HDI | 7.1 | 70 | 120 |

By using ether-based HDI prepolymers cured with diamine curatives such as MCDEA and MDEA, the resulting belts survive a harsh, hot-water environment. The belts may be transport belts, such as long length belts that move articles through hot water or steam environments. The belts may be endless power transmission belts such as toothed belts, V-belts or multi-v-ribbed belts for transmitting power in a belt drive system. The ether-based, HDI prepolymers also provide improved penetration of textile reinforcements during processing due to their very low viscosity.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A belt for power transmission or transport comprising a cast-polyurethane belt body wherein the cast-polyurethane of the belt body is the reaction product of a urethane prepolymer and a diamine chain extender; and the urethane prepolymer is based on a polyether and a linear aliphatic diisocyanate, wherein the polyether is polytetramethylene ether glycol (i.e., "PTMEG") and the linear aliphatic diisocyanate is 1,6-hexamethylene diisocyanate (i.e., "HDI");
    wherein the prepolymer has an NCO content is in the range from 4% to 8% by weight;
    wherein the diamine chain extender is selected from the group consisting of 4,4'-methylene-bis-(3-chloro-2,6-diethylaniline) (i.e., "MCDEA") and 4,4'-methylene-bis-(2,6-diethylaniline) (i.e., "MDEA");
    wherein the molar ratio of amino groups in the diamine chain extender to the isocyanate groups in the prepolymer is in the range of from about 100% to 110%.

2. The belt of claim 1 wherein the prepolymer has a viscosity in the range of less than 500 centipoise at 70° C.

3. The belt of claim 1 further comprising: a tooth cover comprising a fabric; and a tensile member embedded in the belt body.

* * * * *